(12) United States Patent
Yoshimoto et al.

(10) Patent No.: US 10,189,096 B2
(45) Date of Patent: Jan. 29, 2019

(54) CRANKSHAFT MACHINING SYSTEM AND CRANKSHAFT MACHINING METHOD

(71) Applicant: KOMATSU NTC LTD., Toyama (JP)

(72) Inventors: Akihiro Yoshimoto, Komatsu (JP); Masumi Shimomura, Komatsu (JP)

(73) Assignee: KOMATSU NTC LTD., Toyama (JP)

( * ) Notice: Subject to any disclaimer, the term of this patent is extended or adjusted under 35 U.S.C. 154(b) by 372 days.

(21) Appl. No.: 14/650,350

(22) PCT Filed: Jan. 10, 2014

(86) PCT No.: PCT/JP2014/050277
§ 371 (c)(1),
(2) Date: Jun. 8, 2015

(87) PCT Pub. No.: WO2014/119352
PCT Pub. Date: Aug. 7, 2014

(65) Prior Publication Data
US 2015/0306681 A1    Oct. 29, 2015

(30) Foreign Application Priority Data

Jan. 31, 2013 (JP) ................................. 2013-016765

(51) Int. Cl.
*B23B 49/04* (2006.01)
*B23P 23/02* (2006.01)
(Continued)

(52) U.S. Cl.
CPC ............... *B23B 49/04* (2013.01); *B23B 5/18* (2013.01); *B23C 3/06* (2013.01); *B23P 23/02* (2013.01);
(Continued)

(58) Field of Classification Search
CPC .... Y10S 82/903; Y10T 29/17; Y10T 29/5107; Y10T 29/49286; Y10T 82/19;
(Continued)

(56) References Cited

U.S. PATENT DOCUMENTS 3,207,001 A * 9/1965 Healy ..................... B24B 5/428
                                                        74/603
5,408,745 A * 4/1995 Tomiyama .............. B23P 15/00
                                                        29/33 C
(Continued)

FOREIGN PATENT DOCUMENTS

GB          744662 A  *  2/1956  ............. B23B 49/04
JP         51-76682 A     7/1976
(Continued)

OTHER PUBLICATIONS

EPO Machine Translation of JPS6186628—Nakayama et al., "Dynamic Balancing Machine", May 2, 1986.*
(Continued)

*Primary Examiner* — Erica E Cadugan
*Assistant Examiner* — Michael Vitale
(74) *Attorney, Agent, or Firm* — Global IP Counselors, LLP (57) ABSTRACT

A crankshaft machining system includes a center hole boring device, a post-centering balance meter and a cutting device. The post-centering balance meter is configured to measure the shape of a post-centering crankshaft blank on the basis of a pair of center holes. Additionally, the post-centering balance meter is configured to set a principal axis of inertia on the basis of the shape of the post-centering crankshaft blank and generate center hole positional information for correction that indicates intersections between the principal axis of inertia and both end surfaces of the post-centering crankshaft blank. The center hole boring device is config-
(Continued)

ured to bore a pair of center holes on both end surfaces of another crankshaft blank to be loaded next on the basis of the center hole positional information for correction.

3 Claims, 5 Drawing Sheets (51) Int. Cl.
    *B23C 3/06*     (2006.01)
    *B23Q 15/04*     (2006.01)
    *B23B 5/18*     (2006.01)
    *G05B 19/404*     (2006.01)
    *G05B 19/18*     (2006.01)
    *B23Q 17/00*     (2006.01)

(52) U.S. Cl.
    CPC ........... *B23Q 15/04* (2013.01); *G05B 19/182* (2013.01); *G05B 19/404* (2013.01); *B23B 2215/20* (2013.01); *B23P 2700/07* (2013.01); *B23Q 2017/001* (2013.01); *Y10S 82/903* (2013.01); *Y10T 29/17* (2015.01); *Y10T 29/49286* (2015.01); *Y10T 29/5107* (2015.01); *Y10T 409/30756* (2015.01)

(58) Field of Classification Search
    CPC ... Y10T 82/192; Y10T 82/195; Y10T 82/198; B23B 5/18; B23B 49/04; B23B 2215/20; B23C 3/06; B23C 2215/20; B23Q 15/04; B23Q 2017/001

USPC .... 29/6.01, 26 A, 888.08; 82/106, 107, 108, 82/109, 903; 73/460
See application file for complete search history.

(56) References Cited

U.S. PATENT DOCUMENTS

| | | | | |
|---|---|---|---|---|
| 6,397,463 B1* | 6/2002 | Assie | ........................ | B23B 5/18 |
| | | | | 29/406 |
| 6,698,095 B1* | 3/2004 | Assie | ........................ | B23B 5/18 |
| | | | | 29/406 |
| 8,103,374 B2* | 1/2012 | Yoshimoto | .............. | G01M 1/24 |
| | | | | 700/182 |
| 2010/0101085 A1* | 4/2010 | Miura | ........................ | F16C 3/08 |
| | | | | 29/888.08 |

FOREIGN PATENT DOCUMENTS

| | | | | | |
|---|---|---|---|---|---|
| JP | 61-86628 | A | | 5/1986 | |
| JP | 02041730 | A | * | 2/1990 | |
| JP | 9-174382 | A | | 7/1997 | |
| JP | 2010-29994 | A | | 2/2010 | |
| JP | 2010-82728 | A | | 4/2010 | |
| JP | WO 2011093210 | A1 | * | 8/2011 | ............. B23B 49/04 |

OTHER PUBLICATIONS

The International Search Report for the corresponding international application No. PCT/JP2014/050277, dated Feb. 18, 2014.

* cited by examiner

CRANKSHAFT MACHINING SYSTEM AND CRANKSHAFT MACHINING METHOD

CROSS-REFERENCE TO RELATED APPLICATIONS

This application is a U.S. National stage application of International Application No. PCT/JP2014/050277, filed on Jan. 10, 2014. This U.S. National stage application claims priority under 35 U.S.C. § 119(a) to Japanese Patent Application No. 2013-016765, filed in Japan on Jan. 31, 2013, the entire contents of which are hereby incorporated herein by reference.

BACKGROUND

Field of the Invention

The present invention relates to a crankshaft machining system for machining a crankshaft and a crankshaft machining method of machining a crankshaft.

Background Art

In general, a crankshaft is fabricated by machining a crankshaft of a material state (hereinafter referred to as "a crankshaft blank") with reference to a pair of center holes. For example, according to a method described in Japan Laid-open Patent Application Publication No. 2010-29994, a crankshaft is formed as follows. First, a balance center axis of a crankshaft blank is found out by rotating the crankshaft blank and measuring its shape with a balance meter. Next, using a center hole boring device, center holes are bored in the crankshaft blank at intersections between both end surfaces of the crankshaft blank and the balance center axis. Thereafter, using one or more types of cutting devices, main journals and pin journals of the crankshaft blank are cut with reference to the center holes.

In a step described in Japan Laid-open Patent Application Publication No. 2010-29994, the positions of the center holes can be corrected by the center hole boring device through the feedback of the rotational imbalance amount of a finished crankshaft to the center hole boring device.

However, even when the positions of center holes can be corrected by the center hole boring device with respect to a crankshaft in which the center holes have been already bored and for which cutting has been done, the crankshaft is inevitably handled as a defective product unless the rotational imbalance amount thereof falls in an allowable range after the balance correction. Furthermore, the condition of unevenness in thickness of a crankshaft blank tends to vary in accordance with the manufacturing lot of the crankshaft blanks. Hence, every time the manufacturing lot of the crankshaft blanks is changed, a large number of deficit products are inevitably produced.

The present invention has been produced in view of the aforementioned situation. It is an object of the present invention to provide a crankshaft machining system and a crankshaft machining method whereby the number of deficit products can be reduced.

Solution to Problems

A crankshaft machining system according to a first aspect includes a center hole boring device, a post-centering balance meter and a cutting device. The center hole boring device is configured to bore a pair of center holes on both end surfaces of a crankshaft blank. The post-centering balance meter is configured to measure a shape of a post-centering crankshaft blank with reference to the pair of center holes, and the post-centering crankshaft blank is the crankshaft blank having the pair of center holes bored. The cutting device is configured to cut a main journal and a pin journal of the post-centering crankshaft blank. The post-centering balance meter is configured to set a principal axis of inertia on the basis of the shape of the post-centering crankshaft blank and transmit information indicating intersections between the principal axis of inertia and both end surfaces of the post-centering crankshaft blank to the center hole boring device. The center hole boring device is configured to bore a pair of center holes on both end surfaces of another crankshaft blank to be loaded next on the basis of the information that indicates the intersections and is transmitted thereto from the post-centering balance meter.

According to the crankshaft machining system of the first aspect, prior to cutting of the main journal and the pin journal of the post-centering crankshaft blank, ideal center hole positions can be comprehended on the basis of the principal axis of inertia with reference to the pair of center holes. Hence, a pair of center holes can be accurately bored in respective crankshaft blanks to be loaded thereafter. Consequently, the number of crankshafts to be handled as deficit products can be reduced.

In the crankshaft machining system according to the first aspect, the post-centering balance meter may be configured to transmit additional machining information to the cutting device, and the additional machining information indicates a machining position on and a machining amount of a counterweight of the post-centering crankshaft blank, which are required for matching a straight line connecting the pair of center holes with the principal axis of inertia on the basis of the shape of the post-centering crankshaft blank. The cutting device is herein configured to machine the counterweight on the basis of the additional machining information. With the configuration, imbalance can be removed from the post-centering crankshaft blank by matching a center hole reference axis with the principal axis of inertia. Hence, the post-centering crankshaft blank used for generating center hole positional information for correction can be also utilized as a non-defective product.

A crankshaft machining method according to a second aspect includes the steps of boring a pair of center holes on both end surfaces of a crankshaft blank; measuring a shape of a post-centering crankshaft blank with respect to the pair of center holes, the post-centering crankshaft blank being the crankshaft blank having the pair of center holes bored therein; setting a principal axis of inertia on the basis of the shape of the post-centering crankshaft blank; and boring a pair of center holes on both end surfaces of another crankshaft blank to be loaded next on the basis of information indicating intersections between the principal axis of inertia and both end surfaces of the post-centering crankshaft blank.

According to aspects of the present invention, it is possible to provide a crankshaft machining system and a crankshaft machining method whereby the number of deficit products can be reduced.

DETAILED DESCRIPTION OF EXEMPLARY EMBODIMENTS

Crankshaft Blank 1

First, a crankshaft 1 of a material state (hereinafter referred to as "a crankshaft blank 1") as a machining object of a crankshaft machining system to be described will be explained. In the following explanation, the crankshaft blank 1 for an inline-four engine will be described, but the engine type for which the crankshaft blank 1 is used is not limited to this.

Figure 1:
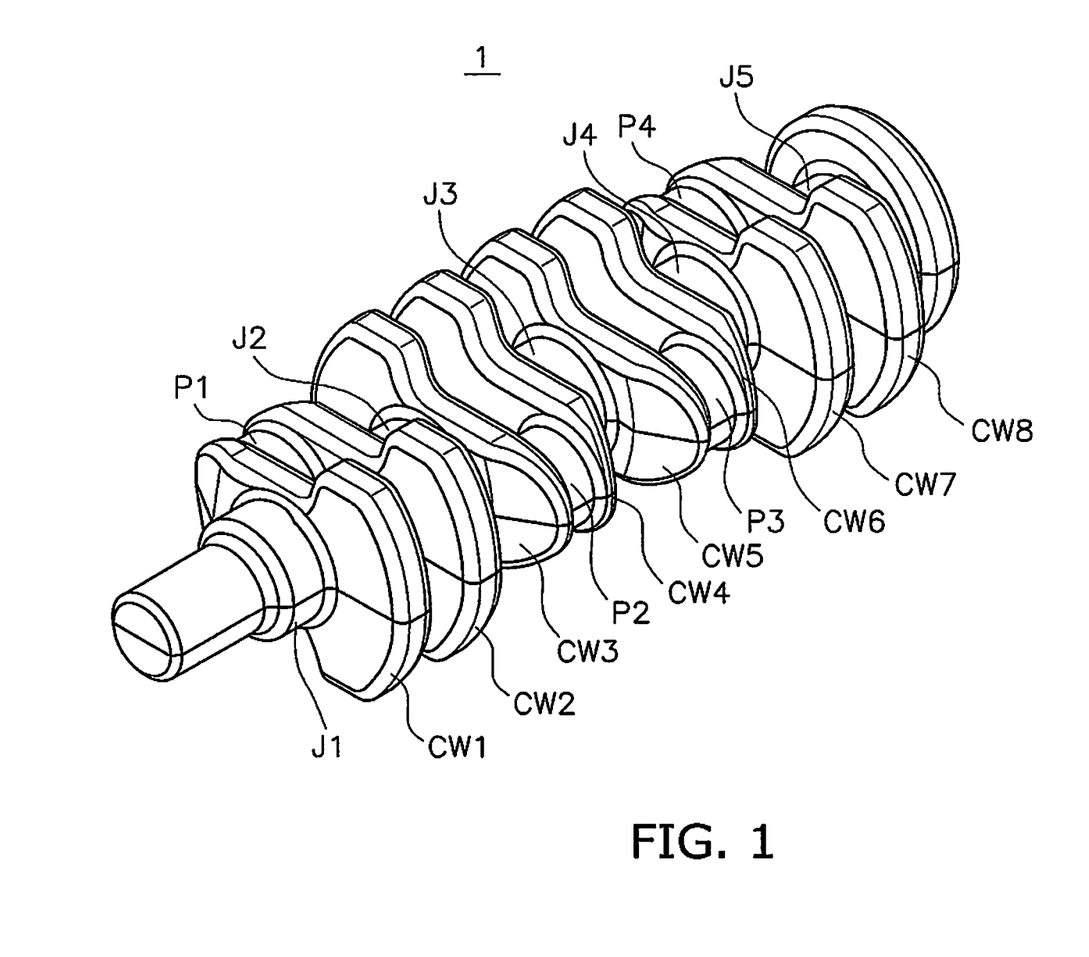
FIG. 1 is an external perspective view of a crankshaft blank.

FIG. 1 is an external perspective view of the crankshaft blank 1.

The crankshaft blank 1 has main journals J (J1 to J5), pin journals P (P1 to P4) and counterweights CW (CW1 to CW8). In the crankshaft blank 1, the main journal J1, the counterweight CW1, the pin journal P1, the counterweight CW2, the main journal J2, the counterweight CW3, the pin journal P2, the counterweight CW4, the main journal J3, the counterweight CW5, the pin journal P3, the counterweight CW6, the main journal J4, the counterweight CW7, the pin journal P4, the counterweight CW8 and the main journal J5 are aligned in this order. For example, the crankshaft blank 1 is fabricated by casting with casting dies or by forging with forging dies.

Crankshaft Machining System 100

Next, a crankshaft machining system 100 according to an exemplary embodiment will be explained.

Figure 2:
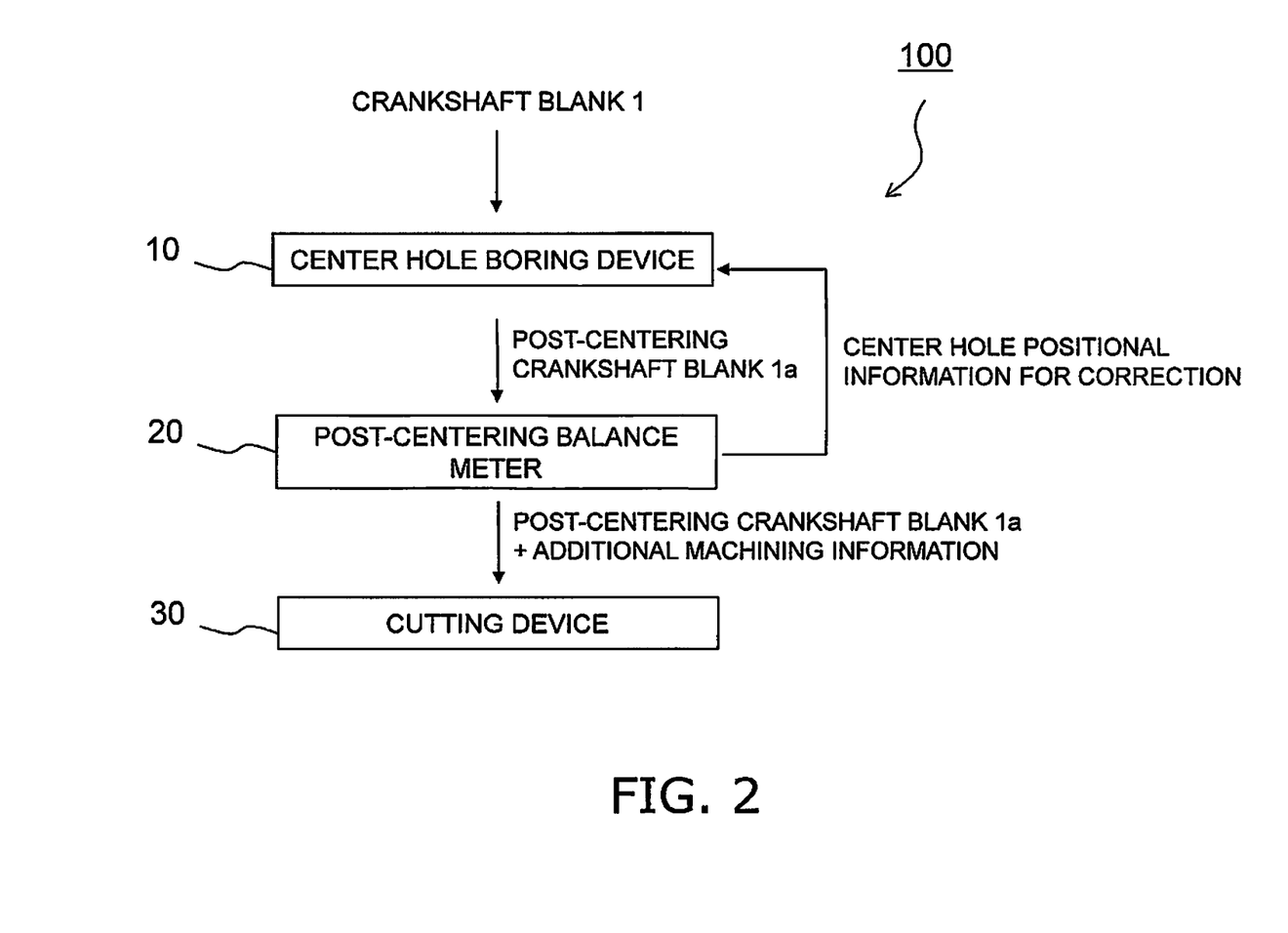
FIG. 2 is a block diagram of a construction of a crankshaft machining system in accordance with an exemplary embodiment of the present invention.
Figure 3:
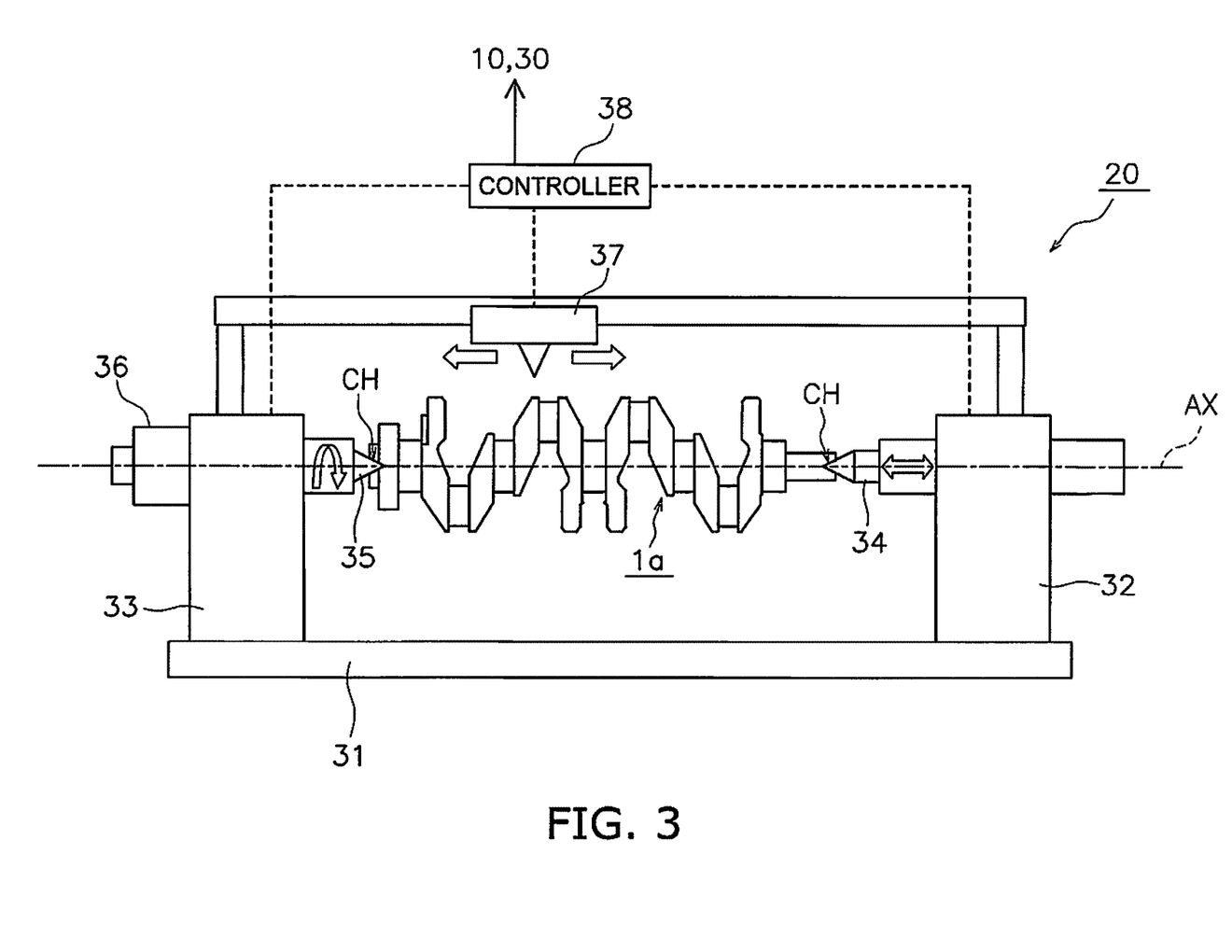
FIG. 3 is a schematic diagram of a construction of a post-centering balance meter in accordance with an exemplary embodiment of the present invention.

FIG. 2 is a block diagram of a construction of the crankshaft machining system 100. FIG. 3 is a schematic diagram of a construction of a post-centering balance meter 20.

As shown in FIG. 2, the crankshaft machining system 100 includes a center hole boring device 10, the post-centering balance meter 20 and a cutting device 30.

Center Hole Boring Device 10

The center hole boring device 10 is configured to bore a pair of center holes on both end surfaces of the crankshaft blank 1 in the condition that the main journals J1 and J5 of the crankshaft blank 1 are clamped.

Specifically, the center hole boring device 10 is firstly configured to clamp the main journals J1 and J5 of the crankshaft blank 1 with a work clamper. Next, the center hole boring device 10 is configured to mill both end surfaces of the crankshaft blank 1 with milling cutters.

Next, the center hole boring device 10 is configured to set the geometric centers of both end surfaces as the positions of center holes. Subsequently, the center hole boring device 10 is configured to drive a pair of center drills to bore a pair of center holes CH (see FIG. 3) in the positions of the geometric centers on both end surfaces.

Thereafter, a crankshaft blank 1a in which the pair of center holes CH has been bored (hereinafter referred to as "a post-centering crankshaft blank 1a") is configured to be transported from the center hole boring device 10 to the post-centering balance meter 20.

Additionally, when receiving center hole positional information for correction (to be described) from the post-centering balance meter 20, the center hole boring device 10 is configured to bore a pair of center holes in center hole positions for correction on both end surfaces of another crankshaft blank 1 to be loaded next. Specifically, the center hole boring device 10 is configured to bore a pair of center holes CH in positions on both end surfaces, which are displaced from the geometric centers of both end surfaces by the displacement amount indicated by the center hole positional information for correction.

Moreover, every time receiving anew the center hole positional information for correction, the center hole boring device 10 is configured to store the cumulative amount of displacement amounts. When the crankshaft blank 1 is a newly loaded one, the center hole boring device 10 is configured to bore a pair of center holes CH on both end surfaces of the crankshaft blank 1 in positions displaced from the geometric centers of both end surfaces by the cumulative amount.

Thus, by the feedback of the center hole positional information for correction from the post-centering balance meter 20 to center hole positional setting, the post-centering crankshaft blank 1a to be fabricated thereafter can be reduced in rotational imbalance amount.

Post-Centering Balance Meter 20

The post-centering balance meter 20 is configured to measure the shape of the post-centering crankshaft blank 1a on the basis of the pair of center holes CH and set a principal axis of inertia of the post-centering crankshaft blank 1a. As shown in FIG. 3, the post-centering balance meter 20 includes a machine base 31, a first center base 32, a second center base 33, a first center 34, a second center 35, a motor 36, a sensor 37 and a controller 38.

The first and second center bases 32 and 33 are fixed onto the machine base 31. The first center 34 is supported by the first center base 32, whereas the second center 35 is supported by the second center base 33. Each of the first and second centers 34 and 35 is movable along and also rotatable about an axis AX. The motor 36 is configured to rotate the second center 35 about the axis AX. At this time, the first and second centers 34 and 35 are being pressed into the pair of center holes CH of the post-centering crankshaft blank 1a. Hence, the first center 34 is configured to be rotated together with the second center 35 through the post-centering crankshaft blank 1a.

The sensor 37 is a displacement meter for measuring the entire circumferential shapes of the counterweights CW1 to CW8 of the post-centering crankshaft blank 1a. For example, a non-contact displacement meter (a laser displacement meter, an infrared displacement meter, an LED displacement sensor, etc.) or a contact displacement meter (a differential transformer, etc.) can be used as the sensor 37.

When the post-centering crankshaft blank 1a is loaded to the post-centering balance meter 20, the controller 38 is configured to drive and control the first and second centers 34 and 35 to insert the tip ends of the first and second centers 34 and 35 into the pair of center holes CH bored on both end surfaces of the post-centering crankshaft blank 1a. The controller 38 is configured to drive and control the motor 36 to rotate the second center 35, and is simultaneously configured to drive and control the sensor 37 to sequentially measure the entire circumferential shapes of the counterweights CW1 to CW8. Specifically, the controller 38 is configured to simultaneously obtain values measured by an encoder mounted in association with a rotary table for rotating the second center 35 and values measured by the sensor 37, and is configured to calculate polar coordinates of the entire circumferences (i.e., shape measurement data) on the basis of the obtained values. One rotation is only required for the shape data calculation of each of the counterweights CW1 to CW8.

The controller 38 is configured to compare the shape measurement data of the counterweights CW1 to CW8 and shape design data of the counterweights CW1 to CW8 and calculate numeric values that indicate differences therebetween (e.g., size differences, vertical and horizontal directional displacements, angular displacements, etc.).

Next, the controller 38 is configured to modify the shape design data of the counterweights CW1 to CW8 with use of the calculated numeric values. Then, the controller 38 is configured to generate three-dimensional shape data of the post-centering crankshaft blank 1a by adding the shape design data of the main journals J (J1 to J5) and the pin journals P (P1 to P4) to the modified shape design data of the counterweights CW1 to CW8. Thereafter, the controller 38 is configured to set the principal axis of inertia with reference to the pair of center holes CH on the basis of the three-dimensional shape data of the post-centering crankshaft blank 1a. It should be noted that PCT International Patent Application Publication No. WO2009/016988 explains an exemplary method of calculating a principal axis of inertia.

Next, the controller 38 is configured to set intersections between the principal axis of inertia with reference to the pair of center holes CH and both end surfaces of the post-centering crankshaft blank 1a as positions in which the pair of center holes CH should have been originally bored (hereinafter referred to as "center hole positions for correction"). The center hole positions for correction are positions ideal for boring a pair of center holes on both end surfaces of the crankshaft blank 1.

Then, the controller 38 is configured to calculate the displacement amount between the center hole positions for correction and the positions in which the pair of center holes CH has been actually bored. The controller 38 is configured to transmit the calculated displacement amount to the center hole boring device 10 as the information that indicates the center hole positions for correction (hereinafter referred to as "center hole positional information for correction"). It should be noted that in the present exemplary embodiment, the controller 38 is configured to calculate the displacement amount and also transmit the center hole positional information for correction to the center hole boring device 10 every time the post-centering crankshaft blank 1a is loaded anew.

Moreover, the controller 38 is configured to set the machining position(s) on and the machining amount(s) of the counterweight(s) CW1 to CW8, which are required for matching a straight line connecting the pair of center holes CH (hereinafter referred to as "a center hole reference axis") with the principal axis of inertia. Specifically, the controller 38 is configured to calculate in which part(s) of the counterweight(s) CW1 to CW8, and to what extent(s), imbalance should be removed to match the center hole reference axis with the principal axis of inertia on the basis of the shape balance of the post-centering crankshaft blank 1a to be calculated from the three-dimensional shape data.

When the post-centering crankshaft blank 1a is transported to the cutting device 30, the controller 38 is configured to transmit, to the cutting device 30, information that is required for imbalance removal and indicates the machining position(s) on and the machining amount(s) of the counterweight(s) CW1 to CW8 (hereinafter referred to as "additional machining information").

Cutting Device 30

The cutting device 30 is configured to cut the main journal(s) J and the pin journals) P of the post-centering crankshaft blank 1a.

Moreover, when receiving the additional machining information in loading of the post-centering crankshaft blank 1a, the cutting device 30 is configured to machine the counterweight(s) CW (CW1 to CW8) on the basis of the additional machining information. As types of machining to be performed at this time, cutting and/or boring are/is performed for the outer peripheral surface and/or the lateral surface of at least one of the counterweights CW (CW1 to CW8). Thus, rotational imbalance in a finished crankshaft can be reduced by the feed-forward of the additional machining information.

After cutting of the counterweight(s) CW, the cutting device 30 is configured to cut the main journal(s) J and the pin journal(s) P with reference to the pair of center holes CH.

It should be noted that the cutting device 30 may include a plurality of machining devices for performing various steps such as cutting of the counterweight(s) CW, rough machining of the main journal(s) J, rough machining of the pin journal(s) P, precision machining of the main journal(s) J and precision machining of the pin journal(s) P. Put differently, the cutting device 30 may be a multifunctional device for cutting of the post-centering crankshaft blank 1a.

Crankshaft Machining Method

Figure 4:
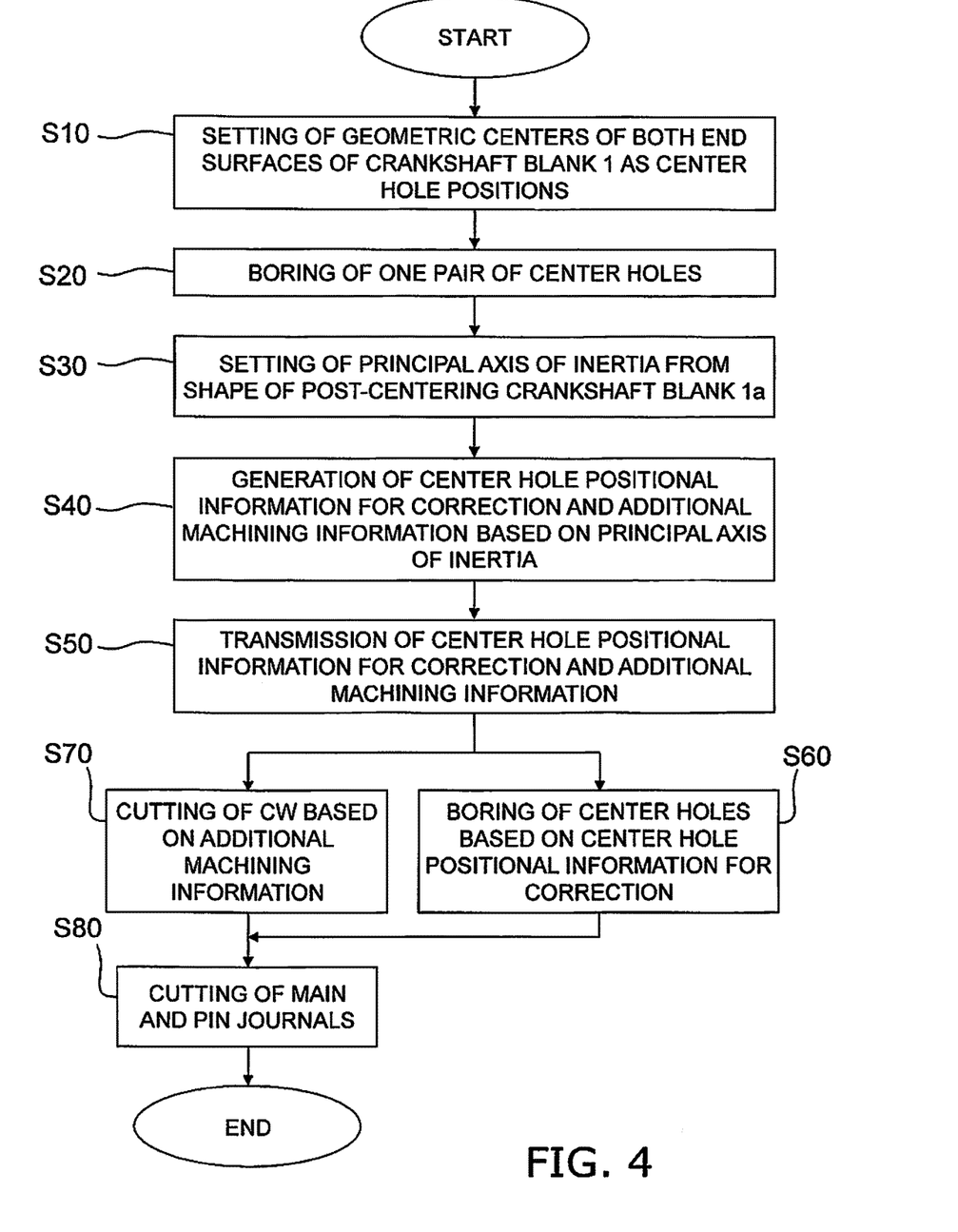
FIG. 4 is a flowchart of a crankshaft machining method in accordance with an exemplary embodiment of the present invention.

Next, a crankshaft machining method will be explained. FIG. 4 is a flowchart for explaining the crankshaft machining method.

In Step S10, the center hole boring device 10 sets geometric centers of both end surfaces of the crankshaft blank 1 as center hole positions.

In Step S20, the center hole boring device 10 bores a pair of center holes CH in the center hole positions on both end surfaces of the crankshaft blank 1.

In Step S30, the post-centering balance meter 20 measures the shape of the post-centering crankshaft blank 1a with reference to the pair of center holes CH and sets a principal axis of inertia of the post-centering crankshaft blank 1a.

In Step S40, the post-centering balance meter 20 sets center hole positions for correction from the principal axis of inertia and generates center hole positional information for correction. Simultaneously, the post-centering balance meter 20 sets the machining position(s) on and the machining amount(s) of the counterweight(s) CW (CW1 to CW8), both of which are required for imbalance removal, and generates additional machining information.

In Step S50, the post-centering balance meter 20 transmits the center hole positional information for correction to the center hole boring device 10, and simultaneously, transmits the additional machining information to the cutting device 30.

In Step S60, the center hole boring device 10 bores a pair of center holes CH in the center hole positions for correction of another crankshaft blank 1 to be loaded anew.

In Step S70, on the other hand, the cutting device 30 cuts the counterweight(s) CW on the basis of the additional machining information. After Steps S60 and S70, the cutting device 30 cuts the main journal(s) J and the pin journal(s) P in Step S80.

The crankshaft machining system 100 includes the center hole boring device 10, the post-centering balance meter 20 and the cutting device 30. The post-centering balance meter 20 is configured to measure the shape of the post-centering crankshaft blank 1a with reference to a pair of the center holes CH. Additionally, the post-centering balance meter 20 is configured to set the principal axis of inertia on the basis of the shape of the post-centering crankshaft blank 1a, and is configured to generate the center hole positional information for correction that indicates intersections between the principal axis of inertia and both end surfaces of the post-centering crankshaft blank 1a. The center hole boring device 10 is configured to bore a pair of center holes CH on both end surfaces of another crankshaft blank 1 to be loaded next on the basis of the center hole positional information for correction.

Therefore, prior to cutting of the main journals) J and the pin journal(s) P of the post-centering crankshaft blank 1a, ideal center hole positions can be comprehended on the basis of the principal axis of inertia set with reference to the pair of the center holes CH. Hence, a pair of the center holes CH can be accurately bored in the respective crankshaft blanks 1 to be loaded thereafter. Consequently, the number of crankshafts to be handled as deficit products can be reduced.

The cutting device 30 is configured to machine the counterweight(s) CW of the post-centering crankshaft blank 1a on the basis of the additional machining information.

With the configuration, imbalance can be removed from the post-centering crankshaft blank 1a by matching the center hole reference axis with the principal axis of inertia. Hence, the post-centering crankshaft blank 1a used for generating the center hole positional information for correction can be also utilized as a non-deficit product.

Other Exemplary Embodiments

Figure 5:
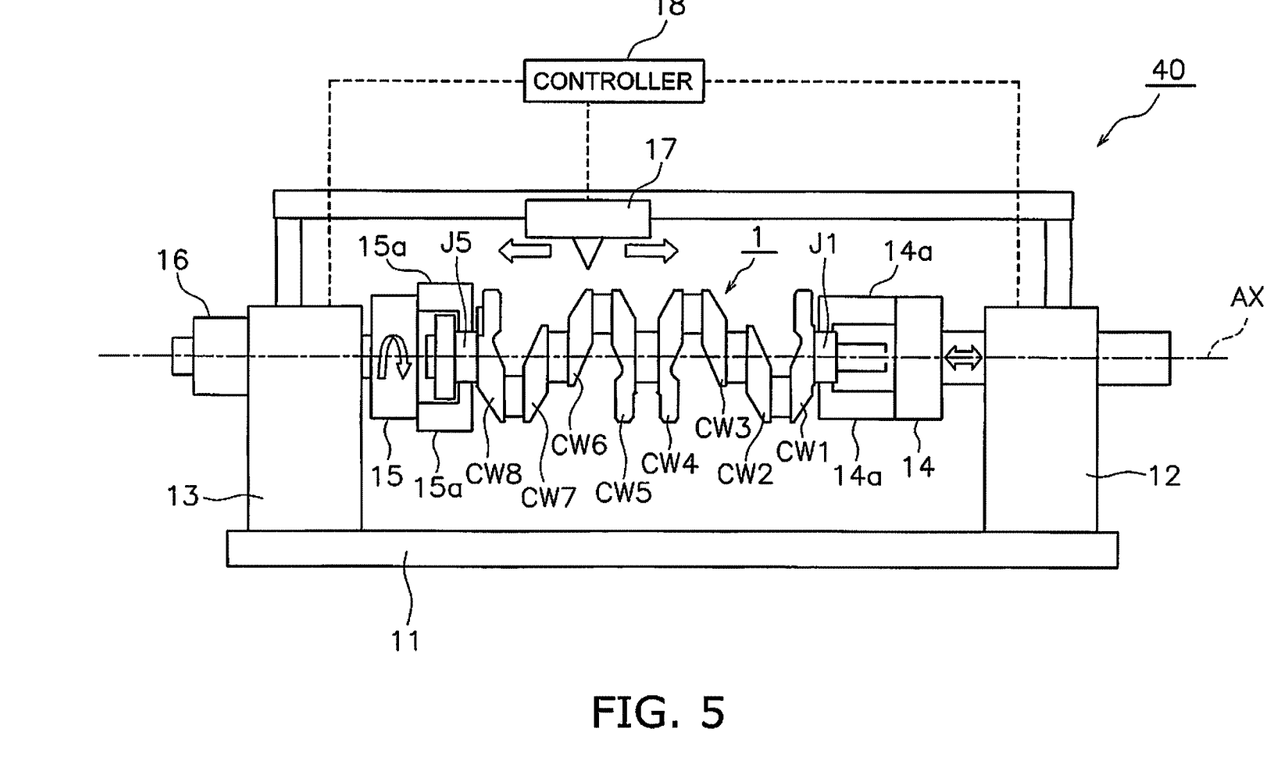
FIG. 5 is a schematic diagram of a construction of a pre-centering balance meter in accordance with an exemplary embodiment of the present invention.

The crankshaft machining system 100 may include a pre-centering balance meter 40 shown in FIG. 5, although not described in the aforementioned exemplary embodiment. The pre-centering balance meter 40 is a device configured to measure the rotational balance of the crankshaft blank 1 and set ideal center hole positions in the crankshaft blank 1 on the basis of the measured rotational balance.

Specifically, as shown in FIG. 5, the pre-centering balance meter 40 includes a machine base 11, a stationary base 12, a drive base 13, a first chuck 14, a second chuck 15, a motor 16, a sensor 17 and a controller 18. When the crankshaft blank 1 is loaded, the controller 18 is configured to drive and control the first and second chucks 14 and 15 to cause them to hold parts of the crankshaft blank 1 that are configured to be clamped by the center hole boring device 10 (i.e., the main journals J1 and J5). Next, the controller 18 is configured to drive the motor 16 to rotate the second chuck 15, and simultaneously drive the sensor 17 to sequentially measure the entire circumferential shapes of the counterweights CW1 to CW8. Next, the controller 18 is configured to set the principal axis of inertia of the crankshaft blank 1 by performing processing similar to that performed by the controller 38 of the post-centering balance meter 20, and is configured to set intersections between the principal axis of inertia and both end surfaces of the crankshaft blank 1 as center hole positions.

Where the crankshaft machining system 100 includes the pre-centering balance meter 40 as described above, the center hole boring device 10 is only required to bore a pair of center holes in the center hole positions to be notified from the pre-centering balance meter 40. On the other hand, the post-centering balance meter 20 is capable of checking whether or not centering is properly performed in machining of the center hole boring device 10 by comparing the positions of a pair of actually bored center holes CH and the center hole positions for correction in the post-centering crankshaft blank 1a. For example, when the positions of actually bored center holes and the center hole positions for correction are different from each other, it is possible to find out malfunctions such as displacement of the clamp positions of the crankshaft blank 1 in the center hole boring device 10.

In the aforementioned exemplary embodiment, the controller 38 of the post-centering balance meter 20 is configured to transmit the additional machining information to the cutting device 30 in every blank loading. However, the controller 38 may be configured to transmit the additional machining information only when the machining amount is greater than or equal to a predetermined threshold. With the configuration, additional machining is configured not to be performed for the counterweight(s) CW as long as the rotational imbalance amount of the post-centering crankshaft blank 1a falls within an allowable range. Hence, work time required for finishing the crankshaft can be reduced.

In the aforementioned exemplary embodiment, the post-centering balance meter 20 is configured to generate the additional machining information of the post-centering crankshaft blank 1a. However, the additional machining information is not required to be generated. In this configuration, although the post-centering crankshaft blank 1a to be firstly produced has chances of being handled as a deficit product, but additional machining can be omitted in the cutting device 30.

Although not particularly described in the aforementioned exemplary embodiment, when the manufacturing lot of the crankshaft blanks 1 is changed, the post-centering balance meter 20 may be configured to set the center hole positions for correction only for the post-centering crankshaft blank 1a to be produced first in the new manufacturing lot. In this configuration, the center hole boring device 10 is supposed to use the same center hole positions for correction with respect to all the crankshaft blanks 1 in the same manufacturing lot. Even in this configuration, the crankshaft blanks exhibit the same tendency of unevenness in thickness on a manufacturing lot basis. Hence, reduction in rotational imbalance amount can be expected for the post-centering crankshaft blanks 1a in the same manufacturing lot.

In the aforementioned exemplary embodiment, the post-centering balance meter 20 is configured to transmit the center hole positions for correction of only a single post-centering crankshaft blank 1a to the center hole boring device 10. However, the post-centering balance meter 20 may be configured to transmit the average of the center hole positions for correction of a plurality of crankshaft blanks. With the configuration, variation among single measurements can be averaged and stable feedback is enabled.

The invention claimed is:

1. A crankshaft machining system comprising:
   a center hole boring device configured to bore a center hole in each of both end surfaces of a crankshaft blank to obtain a post-centering crankshaft blank having a pair of center holes;
   a post-centering balance meter configured to measure a shape of the post-centering crankshaft blank with reference to the pair of center holes;
   a controller configured and arranged to control the post-centering balance meter; and
   a cutting device configured to cut a main journal and a pin journal of the post-centering crankshaft blank after the shape of the post-centering crankshaft blank has been measured,
   the controller being configured to control the post-centering balance meter to determine a principal axis of inertia on the basis of the measured shape of the post-centering crankshaft blank, the controller further being configured to transmit information indicating intersections between the principal axis of inertia and both end surfaces of the post-centering crankshaft blank to the center hole boring device prior to cutting of the main journal and the pin journal of the post-centering crankshaft blank, and the center hole boring device configured to bore a center hole in each of both end surfaces of another crankshaft blank to be loaded next on the basis of the information indicating the intersections.

2. The crankshaft machining system according to claim 1, wherein the controller is configured to transmit additional machining information to the cutting device, the additional machining information indicating a machining position and a machining amount for machining a counterweight of the post-centering crankshaft blank, the machining position and the machining amount being required for matching a straight line connecting the pair of center holes with the principal axis of inertia on the basis of the measured shape of the post-centering crankshaft blank, and the cutting device is configured to machine the counterweight on the basis of the additional machining information.

3. A crankshaft machining method comprising:

providing the crankshaft machining system of claim 1;

boring a center hole in each of both end surfaces of a crankshaft blank to obtain a post-centering crankshaft blank having a pair of center holes;

measuring a shape of the post-centering crankshaft blank with respect to the pair of center holes;

determining a principal axis of inertia on the basis of the shape of the post-centering crankshaft blank after the shape of the post-centering crankshaft blank has been measured and prior to cutting a main journal and a pin journal of the post-centering crankshaft blank; and boring a center hole in each of both end surfaces of another crankshaft blank to be loaded next on the basis of information indicating intersections between the principal axis of inertia and both end surfaces of the post-centering crankshaft blank.

* * * * *